W. Parker.
Horse Rake.
No. 6551.
Patented June 26, 1849.
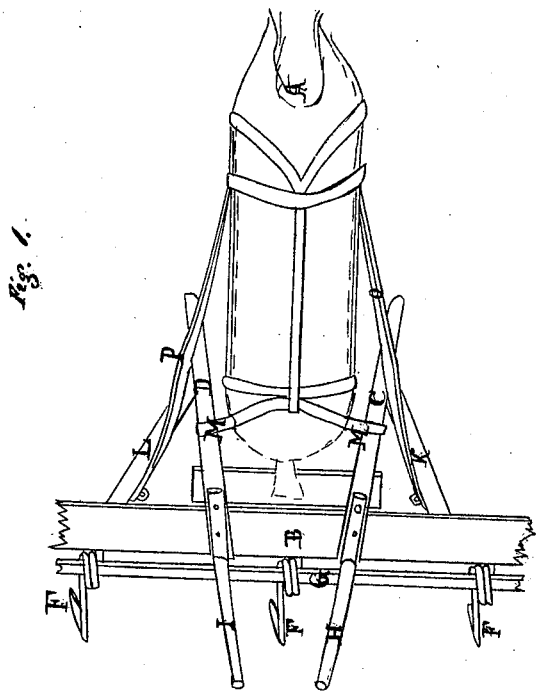
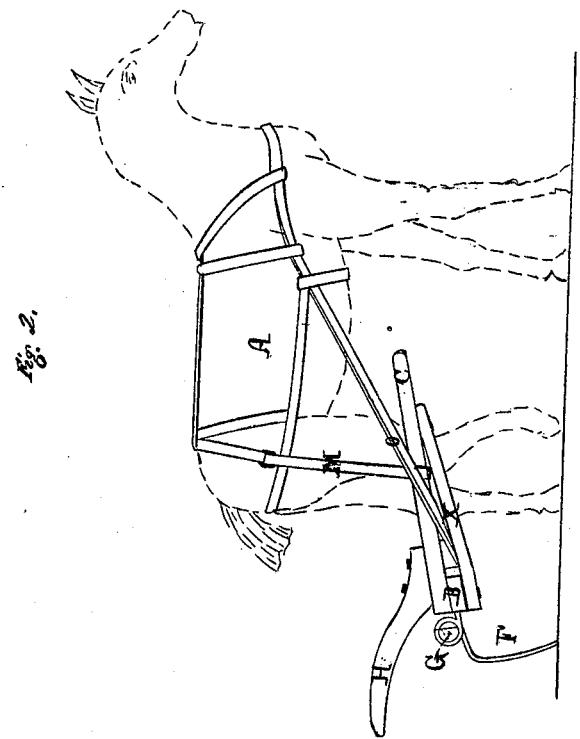

UNITED STATES PATENT OFFICE.

WARREN PARKER, OF PUTNEY, VERMONT.

IMPROVEMENT IN HARNESS ADAPTED TO HORSE-RAKES.

Specification forming part of Letters Patent No. 6,551, dated June 26, 1849.

*To all whom it may concern:*

Be it known that I, WARREN PARKER, of Putney, in the county of Windham and State of Vermont, have invented a new and useful Improvement in the Horse-Rake and Manner of Attaching a Horse thereto; and I do hereby declare that the same is fully described and represented in the following specification and accompanying drawings, letters, figures, and reference thereof.

Of the said drawings, Figure 1 denotes a top view of my rake and a horse attached to it. Fig. 2 is a side elevation of the same.

In said figures, A represents the horse; B, the rake-head; C D, the shafts or thills; F F, &c., the spring-teeth; G, the connecting-bar of the spring-teeth; H I, the rake-handles; K L, braces extending respectively from the thills and to the rake-head, and fastened to both rake-head and thills.

My improvement consists, first, in making the thills or shafts of about two-thirds their usual length, or that which is generally given them when they are supported by straps extending down from the back of the horse, and at or near his shoulders; second, in giving to these shafts, at their front ends, a greater distance apart, or a wider flare or opening than they usually have; third, in bracing them on their front ends by oblique braces K L, extending from them to the rake-head, as seen in the drawings; fourth, in arranging the loops or straps M N, (of the harness,) which support the shafts, at the rump of the horse, and so as to bring the downward strain directly over his rump, instead of over or just in rear of his shoulders; fifth, in attaching the tug-straps or draft-straps O P to the braces at or near their junction with the rake-head, or to the rake-head, so that they may stand obliquely with respect to the horse, as seen in Fig. 1.

By supporting the rake by means of straps or loops depending from the rump of the horse I nearly balance the rake on the hip-straps, and thereby lessen the weight to be raised by the person who attends the rake and directs its operation, he being obliged to exert but about one-half the power in lifting the rake over the windrow that he would if long shafts were used and supported by shoulder-straps. By flaring and shortening the thills, and supporting them in the above-described manner, I am also enabled to readily move the rake laterally and operate it with a greater degree of independence of the movements of the horse than I am when the long thills are used and they are supported on shoulder-straps. The horse therefore works to much better advantage and with more ease to himself than he does with the ordinary long-thill rake. By the peculiar arrangement of the tug-straps and their connection to the rake at the places above represented the unpleasant wiggling motion so often experienced during the operation of raking with the common long-thill rake is avoided. There are also many other advantages resulting from the said improvement, but which I do not deem it necessary to enumerate.

During the operation of raking the rake can easily be kept from contact with the hind legs of the horse, and will present, when properly applied, no material impediment to their movements.

What I claim as my invention, and desire to secure by Letters Patent, is—

1. The arrangement of the hanging-straps M N, (or contrivances which hold up the thills,) so that they may bear on the rump and hips of the horse, instead of on his back at or near his shoulders, in the usual way, and, in combination with such an arrangement, to make the short and flaring thills C D, made and applied to the rake-head, as above specified.

2. The mode of arranging the tug-straps O P and their rear connections—that is, the arranging them obliquely with respect to the horse—and connecting them to the braces or rake-head, as specified.

In testimony whereof I have hereto set my signature this 7th day of December, A. D. 1848.

WARREN PARKER.

Witnesses:
CALVIN W. KEYES.
WM. HOUGHTON.